July 7, 1970 R. H. SEIM 3,519,739
SWITCHING CIRCUIT FOR PROVIDING ONE OR MORE OUTPUT SIGNALS SYNCHRONIZED WITH A REFERENCE SIGNAL
Filed Oct. 22, 1965
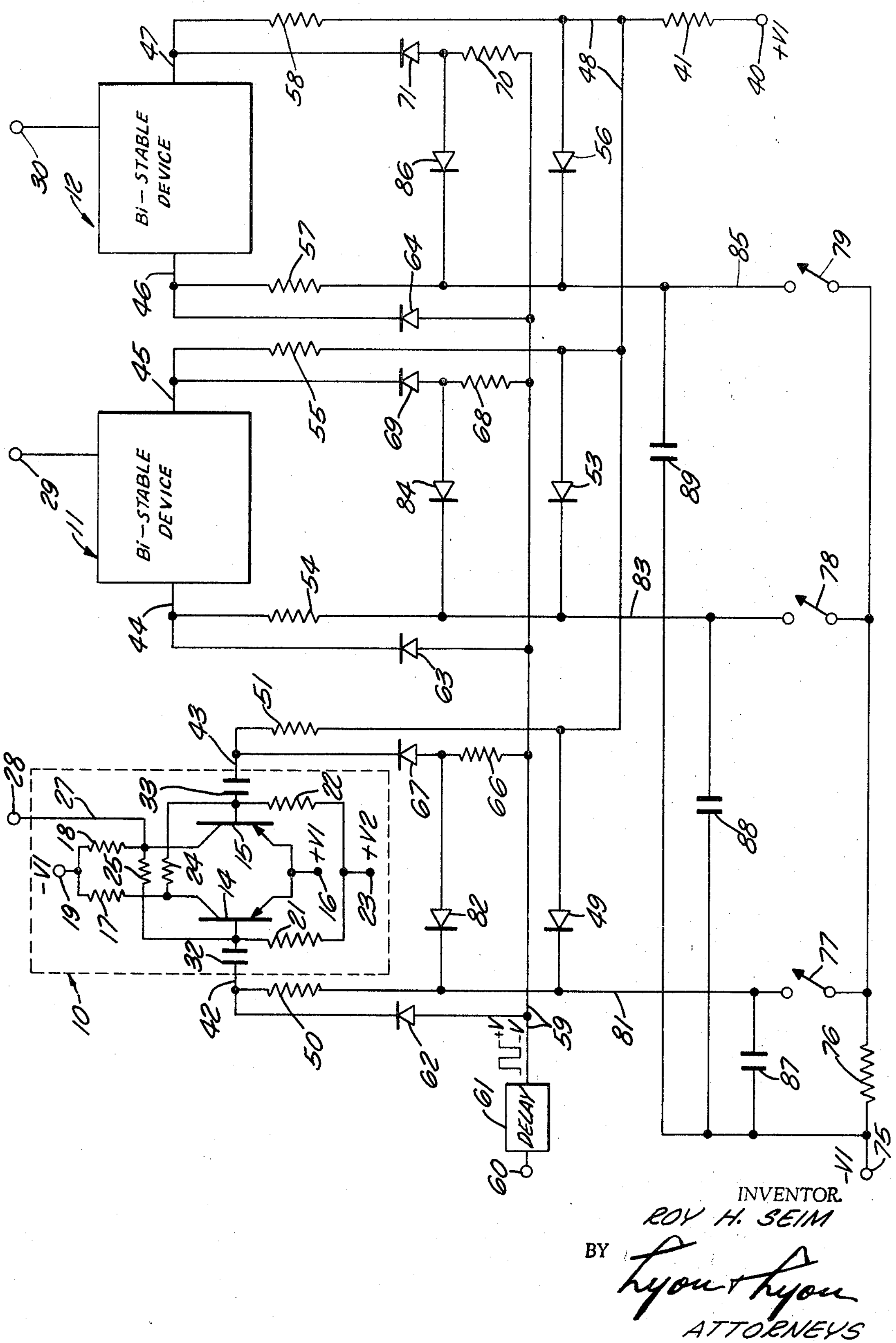
INVENTOR.
ROY H. SEIM
BY Lyon & Lyon
ATTORNEYS United States Patent Office 3,519,739

Patented July 7, 1970

3,519,739
SWITCHING CIRCUIT FOR PROVIDING ONE OR MORE OUTPUT SIGNALS SYNCHRONIZED WITH A REFERENCE SIGNAL

Roy Henry Seim, San Diego, Calif., assignor to Cohu Electronics, Inc., San Diego, Calif., a corporation of Delaware Filed Oct. 22, 1965, Ser. No. 502,160
Int. Cl. H04n 5/22
U.S. Cl. 178—6.8 18 Claims

ABSTRACT OF THE DISCLOSURE

A switching circuit including a plurality of bistable devices for selectively providing one or more output signals synchronized with a reference signal. The bistable devices receive a train of reference pulses, and selectively receive input control signals. Upon the application of a control signal the associated bistable device only changes to a new state upon the occurrence of the next reference signal, and remains in this new state even upon termination of the control signal until a control signal is applied to another bistable device followed by the receipt of another reference signal. Thus, each bistable device is synchronized in operation with reference signals in going from its first to its second, or its second to its first, state.

This invention relates to switching circuits and more particularly to such circuits for selectively providing one or more output signals synchronized with clock signals.

In many instances it is desirable to selectively signal or address one or more of a plurality of electrical devices or circuits in synchronism with some standard or fixed signal, such as clock pulses. The synchronization of two electrical events, such as a single signal with a clock pulse, presents no particular difficulty. However, where it is desirable or necessary to synchronize any one or more of a plurality of electrical events or signals with clock pulses while ensuring that the proper one or ones of the plurality of devices is selected, various spurious signals such as transients may give rise to unreliable switching and lack of synchronization.

One area in which reliable switching of this nature is necessary is in the field of closed circuit television systems. For example, certain closed circuit television systems utilize a plurality of television monitors, any one of which may be connected to one of a number of television cameras. In such systems, for example, it is necessary to rapidly and accurately switch a monitor from one camera to another camera without causing the monitor to flash because of the transient occurring when one camera is switched on before the other camera goes off. Flashing may be eliminated by causing such switching to take place only during the vertical blanking time interval of the television monitor. Since the monitor is blanked for vertical retrace during this time, transients will go unobserved.

An example of a television switching circuit where the present invention may be used is disclosed and claimed in U.S. application Ser. No. 453,116, filed May 4, 1965, now U.S. Pat. No. 3,246,145, by James L. Kimball, William R. Tompkins and Harold R. Ahrena, entitled "Switching System," and assigned to the assignee of the present application. In the system disclosed in that application, a given one of a plurality of switch points is energized by an external pulse to connect a selected camera to a given monitor. Although the system disclosed in that application, the disclosure of which is incorporated by reference herein, is provided with circuitry for eliminating monitor flashing regardless of when an external control signal is applied to one or more switch points, it is sometimes desirable to apply such a control signal only during vertical retrace. This can be accomplished with the present invention by relating the vertical blanking pulses of the television system to the clock pulses discussed above and hereinafter so that a control signal is applied to a switch point in proper relationship with the video blanking signal.

It is accordingly an object of the present invention to provide an improved switching circuit for selectively providing one or more output signals which are respectively synchronized with a reference signal.

It is an additional object of the present invention to provide a switching circuit which accurately synchronizes any one or more of a plurality of electrical signals with reference signals accurately and reliably.

It is another object of the present invention to provide improved circuitry for delaying the occurrence of an event in response to a conditioning event until the occurrence of a timed signal.

A further object of the present invention is to provide circuitry for delaying the initiation or termination of an event in response to another event until the occurence of a timed signal.

It is a further object of the present invention to provide improved circuitry for selectively operating any one or more bistable devices in synchronism with clock signals in an accurate and reliable manner.

An additional object of the present invention is the provision of logical circuitry responsive to one or more input conditioning signals and synchronized with reference signals for selectively providing one or more output signals, respectively.

In accordance with an exemplary embodiment of the teachings of the present invention, a logical switching circuit is provided including one or more bistable devices, such as flip-flops, each of which is normally maintained in a first state. Each of the bi-stable devices is adapted to receive a train of reference or clock pulses and input conditioning or control signals, the latter of which may be provided by mechanical or electronic switch closures, whereby one or more bi-stable devices are caused to change state under the control of a control signal in synchronism with a clock pulse or pulses. When a bi-stable device changes state, it provides an output signal indicative of the new or second state.

These and other objects and features of the present invention will become more apparent upon a consideration of the following description taken in conjunction with the appended drawing, the single figure of which illustrates a switching circuit constructed in accordance with the teachings of the present invention.

Referring now to the drawing, a switching circuit utilizing the concepts of the present invention includes a plurality of bi-stable devices, or flip-flops, 10 through 12. It will be appreciated that a fewer or greater number of the flip-flops 10 through 12 may be provided depending upon the number of electrical circuits or devices desired to be selected or addressed. Each of the flip-flops10 through 12 may take any convenient or conventional form, with a typical circuit being shown in detail for the flip-flop 10.

The flip-flop 10 includes a pair of PNP transistors 14 and 15 having their emitters directly connected together and to a terminal 16 which is adapted to be connected to a positive source of voltage +VI. The collectors of the transistors 14 and 15 are connected through respective resistances 17 and 18 to a terminal 19 which is adapted to be connected to a negative source of voltage —VI. The bases of the transistors 14 and 15 are connetced through respective resistances 21 and 22 to a terminal 23 which is adapted to be connected to a positive source of voltage +V2. The transistors 14 and 15 are cross-coupled by means of resistances 24 and 25, with the resistance 24 being connected from the collector of the transistor 14 to the base of the transistor 15 and the resistance 25 being connected from the collector of the transistor 15 to the base of the transistor 14. An output from flip-flop 10 is taken from the collector of the transistor 15 by means of a line 27 and an output terminal 28. Like output terminals 29 and 30 are provided for the respective flip-flops 11 and 12. These output terminals 28 through 30 may provide control signals which cause a television monitor to be connected to a television camera, for example, in the system disclosed in the aforementioned application. Input coupling capacitors 32 and 33 are connected to the bases of respective transistors 14 and 15. As will appear subsequently, normally the transistor 15 is off, and the transistor 14 is on, thereby applying a voltage to the output terminal 28 of approximately −VI. When the flip-flop is switched to its other or second state, that is with the transistor 14 off and the transistor 15 on, a voltage of approximately +VI is applied to the terminal 28.

A biasing network is provided for each of the flip-flops 10 through 12 and includes a terminal 40 adapted to be connected to a source of positive voltage +VI and a resistance 41 coupled to inputs 42 and 43 of flip-flop 10, inputs 44 and 45 of flip-flop 11, and inputs 46 and 47 of flip-flop 12. The resistance 41 thus is connected to a line 48 which in turn is connected through a series connected diode and resistance circuit to the inputs 42, 44 and 46 of respective flip-flops 10 through 12, and through a resistance to the inputs 43, 45 and 47. Thus, the line 48 is connected through a diode 49 and resistance 50 to the input 42, and through a resistance 51 to the input 43 of the flip-flop 10. In a similar manner, the line 48 is connected through a diode 53 and resistance 54 to the input 44, and through a resistance 55 to the input 45 of the flip-flop 11, through a diode 56 and resistance 57 to the input 46 of the flip-flop 12, and through a resistance 58 to the input 47 of this latter flip-flop.

A line 59 is adapted to be connected to a source of reference or clock pulses. Any suitable source of reference or clock pulses may be employed. Although not to be limited thereby, the switching circuit of this invention may be used with a video switching system, which may be of the nature of that disclosed in said aforementioned U.S. application, in which case a terminal 60 and delay circuit 61 may be utilized if desired for receiving video vertical drive pulses and having an output of delayed clock pulses. In this case, the delay circuit 61 may take any conventional form, and may include a monostable multivibrator, to provide a short delay, phase inversion and amplification. For example, the delay may be for a period sufficient to delay the video switching past the end of other video pulses (such as, equalizing pulses). The line 59 is connected through diodes 62 through 64 to respective inputs 42, 44, and 46 of the flip-flops 10 through 12 respectively. The line 59 also is connected through a resistance 66 and diode 67 to the input terminal 43 of the flip-flop 10, through a resistance 68 and diode 69 to the input 45 of the flip-flop 11, and through a resistance 70 and diode 71 to the input 47 of the flip-flop 12. The line 59 supplies reference or clock pulses to the flip-flops 10 through 12 to synchronize the operation thereof with clock pulses.

The flip-flops 10 through 12 are controlled or conditioned for operation by means of a switch control circuit which includes a terminal 75 connected to a negative source of voltage −VI and also connected through a resistance 76 to a plurality of switches 77 through 79. It will be appreciated that although switches 77 through 79 are illustrated as single pole single throw mechanical switches, other types of switches (such as electronic switches) may be utilized if desired. The switch 77 is connected through a line 81 to the junction of the diode 49 and resistance 50. A diode 82 also is connected between this junction and the junction between the resistance 66 and diode 67. In a similar manner, the switch 78 is connected through a line 83 to the junction of the diode 53 and resistance 54, with a diode 84 being connected to this same junction and to the junction between the resistance 68 and diode 69. A line 85 is connected to the junction between the diode 56 and resistance 57, and a diode 86 is connected from this junction to the junction between the resistance 70 and a diode 71. Capacitances 87 through 89 are connected across the series combination of the resistance 76 and the respective switches 77 through 79.

The above-described logical switching circuit may be utilized to selectively provide a predetermined voltage level output at any one of the terminals 28 through 30, with a change in output being initiated in synchronism with a clock pulse applied to the line 59. An output is selected by closing one of the switches 77 through 79. The incoming clock pulses, which may take the form of essentially square waves and vary between −VI and +VI, do not cause the flip-flops to change from this first state to their second state when the switches 77 through 79 open. In the absence of one of the switches 77 through 79 being closed, a clock pulse applied to the line 59 will not switch the flip-flop from its first to its second state because the diodes, such as the diodes 62 and 67, connected to the inputs of the flip-flops essentially are back-biased.

According to a feature of this invention, if any one or more of the switches 77 through 79 is closed, its associated flip-flop is caused to change to its second state only upon the occurrence of the next received clock pulse on the line 59. For example, the closure of the switch 77 applies a negative voltage to the inputs 42 and 43 of the flip-flop 10 thereby essentially forward-biasing diodes 62 and 67. The next received clock pulse can therefore drive the base of the transistor 14 sufficiently positive to cause this transistor to turn off which in turn causes the transistor 15 to turn on. This clock pulse has no effect at the input 43 of the flip-flop 10 because of the by-pass diode 82 which by-passes the positive excursion of the clock pulse through the switch 77 to the negative voltage terminal 75. If the switches 78 and 79 remain open, the positive excursion of the clock pulse through the inputs 45 and 47 of flip-flops 11 and 12 change these flip-flops to their first state, if they were in their second state (i.e. they will be reset). This reset action occurs because the line 48 is negative when the switch 77 is closed. The diodes 69 and 71 are forwarded biased through respective resistances 55 and 58. When the clock pulse occurs, it is conducted by the diodes 69 and 71 to the inputs 45 and 47 to reset the respective flip-flops 11 and 12, if either of these flip-flops have been set. This clock pulse also is the one which sets the flip-flop 10, and it remains set after the clock pulse terminates until reset when another flip-flop is set. Correspondingly, each of the other switches 78 and 79 causes its associated flip-flop to set while causing all other flip-flops connected to the line 48 to be reset. This arrangement results in one, and only one, flip-flop connected to the line 48 being in a set state, and forms an electrical inter-lock when this circuit is used to control a single output device, such as the selection of a video output connected from a multiple input video switching device. However, where desired more than one of the flip-flops 10 through 12 may be set if its corresponding switch 77 through 79 is closed.

It should be pointed out that the resistances 50 and 51 (and like resistances 54, 55, 57 and 58 connected to the inputs of the flip-flops 11 and 12) are sufficiently large in order to prevent the flip-flop 10 from changing state upon closure of the switch 77 because the time constants of the network including resistance 50 and capacitance 32, and the network including resistance 51 and capacitance 33 are sufficiently long to prevent any rapid change in the charge on the respective capacitors. Additionally, the capacitor 87 (and similar capacitors 88 and 89) also prevents a rapid voltage change at the inputs 42 and 43

(and inputs 44 through 47) to minimize any spikes which may tend to cause improper triggering of the remaining flip-flops when a switch is closed or opened.

According to an additional feature of the present invention, a flip-flop which has been switched from its first to its second state by the operation of its associated control switch 77 through 79, will remain in the second state even after the associated control switch is opened until another closure is made of another switch 77 through 79 and the arrival of the next clock pulse. Thus, not only is the operation of a flip-flop synchronized with the clock pulse in going from its first to its second state, but also it is sychronized with a clock pulse in returning to the first state. For example, assume that switch 77 has been closed and is subsequently opened. Although the voltage at the inputs 42 and 43 of the flip-flop 10 change from a negative to a positive value, the charge on the capacitors 33 and 87 does not change rapidly enough to cause the transistor 15 to turn off.

The following are exemplary component values which may be utilized in constructing a logical switching circuit of the nature shown in the drawing:

Resistances:
- 17, 18—2.2K ohms
- 21, 22—56K ohms
- 24, 25—18K ohms
- 41—10K ohms
- 50, 51—56K ohms
- 54, 55—56K ohms
- 57, 58—56K ohms
- 76—100 ohms Capacitances:
- 32, 33—500 picofarads
- 87, 88, 89—.1 microfarad Transistors—2N3638
Diodes—1N457
V1—10 volts
V2—20 volts It now should be apparent that the present invention provides logical switching circuitry for selectively supplying, terminating, and interlocking one or more output signals in synchronism with clock pulses. It will be understood that although an exemplary embodiment of the present invention has been disclosed and discussed, other applications and circuit arrangements are possible and that the embodiment disclosed may be subjected to various changes, modifications, and substitutions without necessarily departing from the spirit of the invention.

What is claimed is:

1. A switching circuit including a plurality of multistable devices each of which has at least first and second stable states, first circuit means coupled with each device for biasing each device, and second circuit means for receiving reference pulses coupled with each device, the improvement comprising: switching means, including a control switch for each device coupled to the first circuit means thereof, having a first state of operation for conditioning any of said services to change from a first stable state to a second stable state with the application of a following reference pulse applied by said second circuit means, and having a second state of operation for conditioning any of said devices to change from a second stable to a first stable state with the application of a following reference pulse applied by said second circuit means, and unilaterally conductive by-pass means connected between the second circuit means and the first circuit means respectively coupled with each device for preventing reference pulses from returning an associated device to its first stable state while being conditioned by said switching means.

2. A switching circuit including a plurality of flip-flops each of which has first and second imputs and at least one output, and each of which has at least first and second stable states, biasing circuit means coupled with each flip-flop for biasing each flip-flop, and clock circuit means for receiving clock pulses coupled with each flip-flop, the improvement comprising: said biasing circuit means including a first terminal for connection with a source of voltage and connected through a respective first diode and first resistance to the first input of each flip-flop and through a respective second resistance to the second input of each flip-flop, said clock circuit means including a second terminal for receiving said clock pulses, said second terminal being connected through a respective second diode to the first input of each flip-flop and connected through a respective third resistance and third diode to the second input of each flip-flop, switching means, including a control switch for each flip-flop coupled to the biasing circuit means thereof, for selectively conditioning any one or more of said flip-flops to change from a first to a second stable state with the application of a following clock pulse applied by said clock circuit means, said switching means including a third terminal for connection with a source of voltage, said third terminal being connected through a fourth resistance to one side of all of said control switches, the other side of each said control switch being connected to the respective junctions between said first diode and first resistance, and a diode connected from the respective junction of each of said first diode and first resistance to the respective junction between each said third resistance and third diode for preventing clock pulses from returning an associated flip-flop to its first stable state while being conditioned by said switching means.

3. A switching circuit including a plurality of flip-flop each of which has first and second inputs and at least one output, each of said flip-flops includes a pair of cross-coupled semiconductive devices each having a control electrode and first and second input capacitances, said first capacitance being connected between said first input and said control electrode of said first semiconductive device and said second capacitance being connected between said second input and said control electrode of said second semiconductive device, biasing circuit means coupled with each flip-flop for biasing each flip-flop, and clock circuit means for receiving clock pulses coupled with each flip-flop, the improvement comprising: said biasing circuit means including a first terminal for connection with a source of voltage and connected through a respective first diode and first resistance to the first input of each flip-flop and through a respective second resistance to the second input of each flip-flop, said clock circuit means including a second terminal for receiving said clock pulses, said second terminal being connected through a respective second diode to the first input of each flip-flop and connected through a respective third resistance and third diode to the second input of each flip-flop, switching means, including a control switch for each flip-flop coupled to the biasing circuit means thereof, for selectively conditioning any of said flip-flop to change from a first to a second stable state with the application of a following clock pulse applied by said clock circuit means, said switching means including a third terminal for connection with a source of voltage, said third terminal being connected through a fourth resistance to one side of all of said control switches, the other side of each said control switch being connected to the respective junctions between said first diode and first resistance, a diode connected from the respective junction to each of said first diode and first resistance to the respective junction between each said third resistance and third diode for preventing clock pulses from returning an associated flip-flop to its first stable state while being conditioned by said switching means, and a plurality of capacitances, all of which have one terminal connected to said third terminal and another terminal respectively connected to said other side of said control switches.

4. A switching circuit for providing output signals in synchronism with reference signals comprising: first means for providing said output signals, first circuit means coupled with said first means for biasing said first means, second circuit means coupled to said first means, said second circuit means receiving reference signals, switching means coupled with said first circuit means for selectively conditioning said first means, said first means when conditioned by said switching means providing a predetermined output signal upon the application of a succeeding reference signal applied by said second circuit means, and unilaterally conductive by-pass means connected between the second circuit means and the first circuit means for preventing reference signals from changing the output of said first means while said first means is conditioned by said switching means by bypassing reference signals to said switching means.

5. A switching circuit for supplying output signals in synchronism with reference signals comprising: a bi-stable device, first circuit means coupled with said bi-stable device for biasing said bi-stable device, second circuit means coupled to said bi-stable device, said second circuit means receiving reference signals, switching means coupled with the first circuit means for selectively conditioning said bi-stable device, said bi-stable device when conditioned by said switching means providing a predetermined output signal upon the application of a succeeding reference signal applied by said second circuit means, and unilaterally conductive by-pass means connected between the second circuit means and the first circuit means for preventing reference signals from changing said predetermined output signals of said bi-stable device while said bi-stable device is condition by said switching means by bypassing reference signals to said switching means.

6. A switching circuit for selectively supplying one or more output signals in synchronism with reference signals, said switching circuit including a plurality of stages with each stage including: first means for providing output signals in synchronism with said reference signals, first circuit means coupled with said first means for biasing said first means, second circuit means coupled to said first means, said second circuit means receiving said reference signals, switching means coupled with said first circuit means for selectively conditioning said first means to provide a predetermined output signal upon the application of a succeeding reference signal applied by said second circuit means, and unilaterally conductive by-pass means connected between the second circuit means and the first circuit means for preventing reference signals from changing said predetermined output signal of said first means while said first means is conditioned by said switching means.

7. A switching circuit for selectively supplying one or more output signals in synchronism with input reference signals, said switching circuit including a plurality of stages each stage including: first means having first and second inputs, and an output for providing said output signals, first circuit means for biasing said first means, and including a first terminal connected through first network means which is unilaterally conductive to said first input and through second network means to said second input, second circuit means for receiving said reference signals, and including a second terminal connected through third network means which is unilaterally conductive to said first input and through fourth network means which is unilaterally conductive to said second input, switching means for conditioning said first means, and having a pair of terminals, the first of which is connected to a third terminal and the second of which is connected to said first network means, and a unilaterally conductive means connected between said first and second circuit means for preventing reference signals from affecting the operation of said first means while being conditioned by said switching means, the first terminal of the first circuit means for each stage being connected through impedance means to a source of voltage, the second terminal of the second circuit means of each stage being connected together and to a source of said reference signals, and the third terminal of each stage being connected together and through an impedance means to a source of voltage.

8. A switching circuit including a plurality of bi-stable devices each of which has two inputs and at least one output, the output serving to provide predetermined signals, first and second circuit means coupled with each bi-stable device, the improvement comprising: said first circuit means including a first terminal connected through a respective first unilaterally conductive device and first resistance to said first input of each bi-stable device and through a respective second resistance to said second input of each bi-stable devices, all of said first terminals being connected together and through a first impedance to a conductor adapted to receive a source of voltage, said second circuit means including a second terminal connected through a respective second unilaterally conductive device to said first input of each bi-stable device and through a respective third resistance and third unilaterally conductive device to said second input of each bi-stable device, each of said second terminals being connected together and adapted to receive a source of reference signals, a fourth unilaterally conductive device associated with each bi-stable device and coupled from the respective junction between said first diode and first resistance to the respective junction between said third resistance and third diode, and a plurality of control switch means respectively associated with said bi-stable devices including first and second sides, said first sides being coupled together and through a second impedance adapted to be connected to a source of voltage, and the second sides being respectively connected to the junctions between said first diode and first resistance.

9. A switching circuit including a plurality of bi-stable devices each of which has two inputs and at least one output, the output serving to provide predetermined signals, first and second circuit means coupled with each bi-stable device, the improvement comprising: said first circuit means including a first terminal connected through a respective first unilaterally conductive device and first resistance to sad first input of each bi-stable device and through a respective second resistance to said second input of each bi-stable device, all of said first terminals being connected together and through a first impedance to a source of voltage, said second circuit means including a second terminal connected through a respective second unilaterally conductive device to said first input of each bi-stable device and through a respective third resistance and a third unilaterally conductive device to said second input of each bi-stable device, each of said second terminals being connected together and to a source of reference frequency signals, a fourth unilaterally conductive device associated with each bi-stable device and coupled from the respective junction between said first diode and first resistance to the respective junction between said third resistance and third diode, a plurality of control switch means respectively associated with said bi-stable devices including first and second sides, said first sides being coupled together and through a second impedance to a source of voltage, and the second sides being respectively connected to the junctions between said first diode and first resistance, and a plurality of capacitances having first and second leads, with the first leads being connected together and to the end of said second impedance remote from said first control switch side, and with the second leads thereof respectively being connected with the second sides of said control switches.

10. A switching circuit for selectively providing one or more predetermined output signals in synchronism with input clock pulses, said switching circuit including a plurality of stages with each stage including: a bi-stable device having first and second inputs, and at least one output for supplying said output signals, a biasing circuit including a first terminal connected through a first diode and first resistance to said first input and through a second resistance to said second input, a clock circuit including a second terminal connected through a second diode to said first input and through a third resistance and third diode to said second input, a fourth diode connected from the junction between said first diode and first resistance to the junction between said third resistance and third diode, and control switch having a pair of terminals, the first of which is connected to a third terminal and the second of which is connected to the junction between said first diode and first resistance, the first terminals of the biasing circuits for each stage being connected through an impedance to a source of voltage, the second terminals of the clock circuit of each stage being connected together and to a source of clock pulses, and the third terminals of each stage being connected together and through an impedance to a source of voltage.

11. A switching circuit for selectively providing one or more predetermined output signals in synchronism with input clock pulses, said switching circuit including a plurality of stages with each stage including: a bi-stable device having first and second inputs, and at least one output for providing said output signals, a biasing circuit including a first terminal connected through a first diode and first resistance to said first input and through a second resistance to said second input, a clock circuit including a second terminal connected through a second diode to said first input and through a third resistance and third diode to said second input, a fourth diode connected from the junction between said first diode and first resistance to the junction between said third resistance and third diode, and switching means having a pair of terminals, the first of which is connected to a third terminal and the second of which is connected to the junction between said first diode and first resistance, the first terminals of the biasing circuits for each stage being connected through an impedance to a source of voltage, the second terminals of the clock circuit of each stage being connected together and to a source of clock pulses, and the third terminals of each stage being connected together and through an impedance to a source of voltage, and a capacitor being coupled with each of said control switches for suppressing electrical transients caused by the operation thereof.

12. In a system for supplying signals to the switching means of a video system including one or more video cameras and one or more video monitors which are to be interconnected, a switching circuit for selectively providing control signals in synchronism with reference signals comprising: a plurality of first means for providing said control signals, each of said first means having a first state of operation for providing said control signals and a second reset state of operation, first circuit means coupled with said first means for biasing said first means, second circuit means coupled with said first means, said second circuit means receiving said reference signals, and switching means coupled between a voltage input terminal and said first circuit means for selectively conditioning said first means to cause one of said first means to provide a predetermined control signal and at least another of said first means to reset upon the application of a following reference signal supplied by said second circuit means, said predetermined control signal existing until said switching means conditions another of said first means and said one of said first means is reset.

13. In a system for supplying signals to the switching means of a video system including one or more video cameras and one or more video monitors which are to be interconnected during a vertical blanking time interval of a monitor, a switching circuit for selectively providng one or more control signals in synchronism with respective reference signals comprising: a plurality of bistable devices, first circuit means coupled with each bistable device for biasing each bi-stable device, second circuit means coupled with each bi-stable device, said second circuit means receiving said reference signals, switching means coupled between a voltage input terminal and said first circuit means for selectively conditioning said bi-stable devices to cause a bi-stable device to provide a predetermined control signal upon the application of a following reference signal supplied by said second circuit means, said predetermined control signal existing until another of said bi-stable devices is conditioned, and unilaterally conductive means connected between said second circuit means and said first circuit means for preventing reference signals from causing a bi-stable device to terminate a predetermined control signal while being conditioned by said switching means.

14. In a system for supplying signals to the switching means of a video system including one or more video cameras and one or more video monitors which are to be interconnected during a vertical blanking time interval of a monitor, a switching circuit selectively providing one or more control signals in synchronism with a vertical blanking time interval comprising: a plurality of bi-stable devices each having an input, and an output for providing said control signals, first means receiving and delaying video vertical drive pulses for providing reference signals, first circuit means coupled with said bi-stable devices for biasing said bi-stable devices, second circuit means coupled with said first means and said bi-stable devices, said second circuit means receiving said reference signals, switching means for selectively conditionng any one or more of said bi-stable devices to cause a bi-stable device to provide a predetermined control signal upon the application of a following reference signal supplied by said second circuit means, and by-pass means connected between said second circuit means and said first circuit means for preventing reference signals from causing a bi-stable device to terminate said predetermined control signal while being conditioned by said switching means by bypassng reference signals to said switching means.

15. A switching circuit for providing output signals in synchronism with reference signals comprising: first means for providing said output signals, first circuit means coupled with said first means for biasing said first means, second circuit means coupled to said first means, said second circuit means receiving reference signals, switching means coupled between a voltage input and said first means for selectively biasing said first means to provide a predetermined output signal upon the application of a succeeding reference signal applied by said second circuit means, and unilaterally conductive by-pass means connected between said second circuit means and the first circuit means for preventing reference signals from changing said output of said first means while said first means is supplied a predetermined bias by said switching means by bypassing reference signals to said switching means.

16. A switching circuit for selectively supplying one or more output signals in synchronism with reference signals, said switching circuit including a plurality of stages with each stage including: first means for providing output signals in synchronism with said reference signals, first circuit means coupled with said first means for biasing said first means, second circuit means coupled to said first means, said second circuit means receiving said reference signals, switching means coupled with said first circuit means for selectively conditioning said first means to provide a predetermined output signal upon the application of a succeeding reference signal applied by said second circuit means, means connected between said second circuit means and the first circuit means for preventing reference signals from changing said predetermined output signal of said first means while said first means is conditioned by said switching means and capacitive means coupled between the first circuit means and first means for preventing an output signal change in one stage until another stage is conditioned by its switching means.

17. A switching circuit for selectively supplying one of several output signals in synchronism with reference signals, said switching circuit including a plurality of bi-stable devices each of which has at least first and second stable states; first biasing circuit means coupled with each device for biasing each device; second circuit means coupled with each device for receiving and supplying reference signals to each of said devices; and switching means coupled to said first circuit means for selectively conditioning one of said devices to enable the same to change from a first to a second of its stable states upon the receipt of a following reference signal applied by said second circuit means and also conditioning another of said devices to enable the same to change from a second to a first of its stable states upon the receipt of said following reference signal, said switching means including a control switch for each device coupled to the first circuit means for selectively applying a predetermined voltage to said first circuit means for conditioning said device.

18. A switching circuit for selectively supplying one of several output signals in synchronism with reference signals, said switching circuit including a plurality of bistable devices each of which has inputs for causing the same to switch from a first to a second stable state and a second to a first stable state; first biasing circuit means coupled with each device for biasing each device; second circuit means coupled with each device for receiving and supplying reference signals to each of said devices, said second circuit means comprising unilaterally conductive devices coupled respectively to said inputs of said devices; switching means coupled to said first circuit means for selectively conditioning one of said devices to enable the same to change from a first to a second of its stable states upon the receipt of a following reference signal applied by said second circuit means and also conditioning another of said devices to enable the same to change from a second to a first of its stable states upon the receipt of said following reference signal, said switching means including a control switch for each device coupled to a respective portion of said first circuit means which is coupled to a respective device for selectively applying a predetermined voltage to said first circuit means; and unilaterally conductive means connected between the second circuit means and the first circuit means at each of said stages for preventing reference signals from returning a respective device to its first stable state while it is conditioned by its respective control switch.

References Cited

UNITED STATES PATENTS 2,535,471 12/1950 White et al. -------- 179—7.1

ROBERT L. GRIFFIN, Primary Examiner

R. K. ECKERT, Jr., Assistant Examiner

U.S. Cl. X.R.

307—272; 328—205